(12) United States Patent
Mollmann

(10) Patent No.: US 6,445,995 B1
(45) Date of Patent: Sep. 3, 2002

(54) VIBRATION SENSING IN GAS TURBINE ENGINE

(75) Inventor: Daniel Edward Mollmann, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/770,326

(22) Filed: Jan. 26, 2001

(51) Int. Cl.[7] .............................................. G06E 19/00
(52) U.S. Cl. ....................................... 701/100; 235/103
(58) Field of Search ............................ 701/100; 290/40, 290/40 A, 40 L; 310/90, 91; 235/103, 103.5 R, 104

(56) References Cited

U.S. PATENT DOCUMENTS

| | | | | |
|---|---|---|---|---|
| 3,866,108 A | * | 2/1975 | Yannone et al. | 290/40 |
| 3,866,109 A | * | 2/1975 | Reed et al. | 290/40 |
| 3,898,439 A | * | 8/1975 | Reed et al. | 235/151.21 |
| 5,252,860 A | * | 10/1993 | McCarty et al. | 60/39.03 |
| 6,191,513 B1 | * | 2/2001 | Chen et al. | 310/90 |

* cited by examiner

*Primary Examiner*—Richard M. Camby
(74) *Attorney, Agent, or Firm*—Nathan D. Herkamp; Gregory A. Welte

(57) ABSTRACT

A vibration detector. A machine, such as a gas turbine engine, contains a rotor bearing and a gear. A nearby sensor produces a train of pulses as teeth of the gear travel past. The frequency of the pulse train indicates rotational speed of the rotor. In addition, vibration of the rotor causes the gear to orbit about another center. The orbiting causes amplitude modulation, frequency modulation, or both, in the pulse train. Detection of the modulation indicates the presence of vibration. Thus, a single pulse train, produced by a single sensor, is used to indicate both speed, and the presence of vibration.

14 Claims, 9 Drawing Sheets

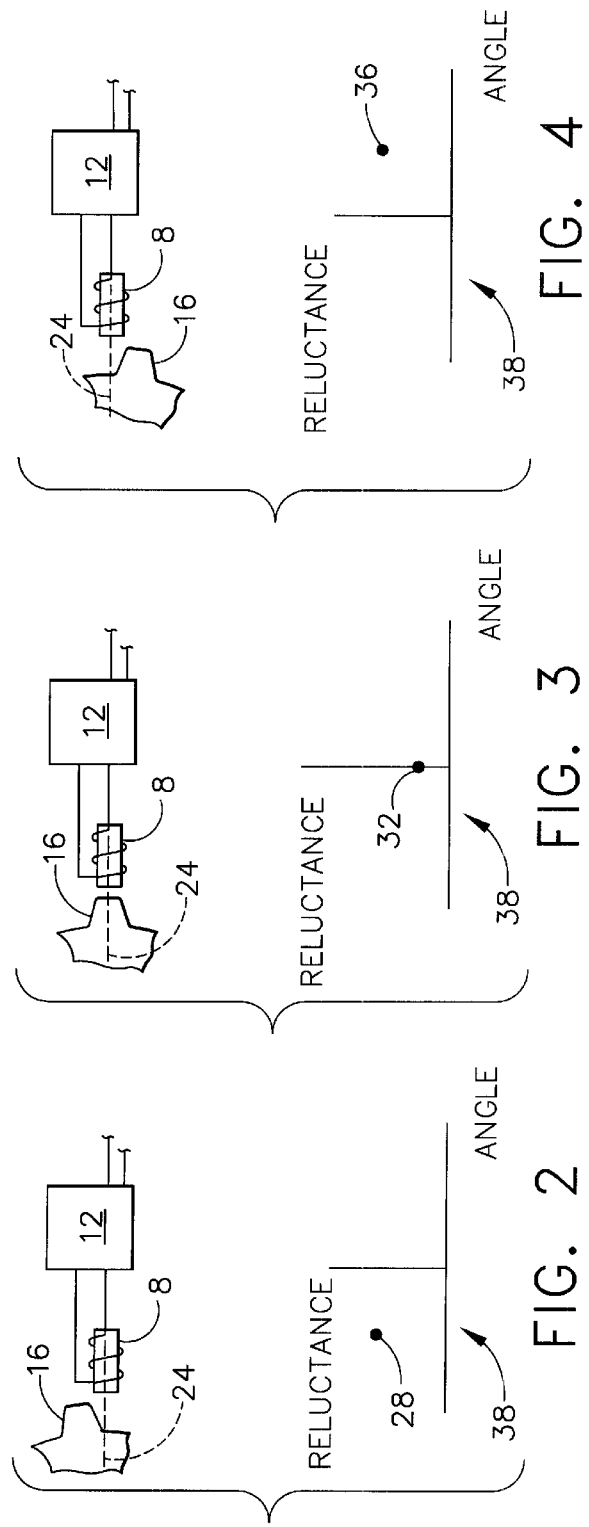
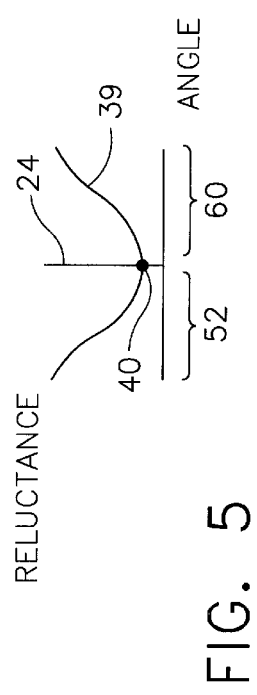
FIG. 2
FIG. 3
FIG. 4
FIG. 5

SPEED SIGNAL WITH AMPLITUDE AND FREQUENCY MODULATION

SPEED SIGNAL WITH AMPLITUDE AND FREQUENCY MODULATION

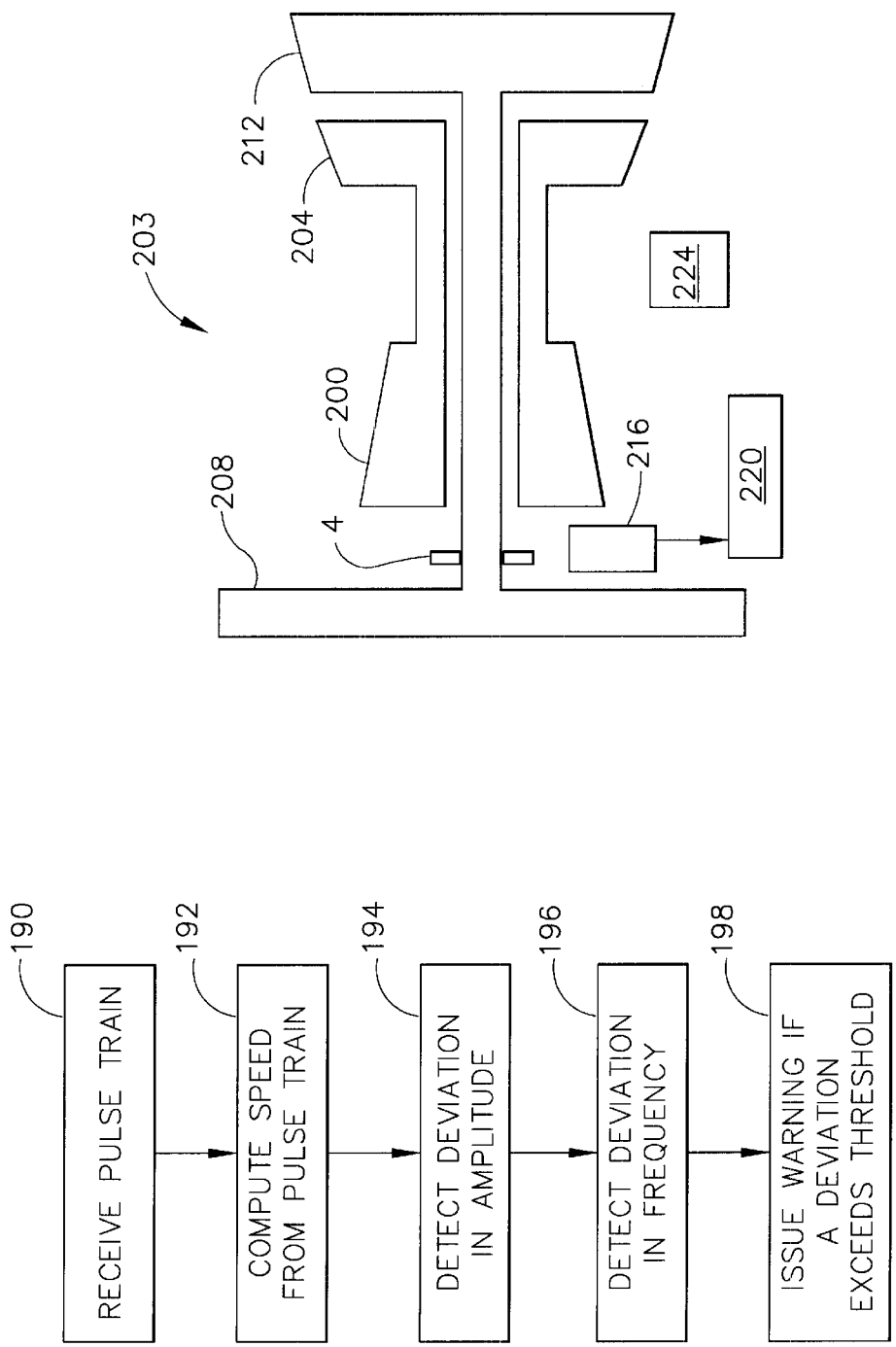

VIBRATION SENSING IN GAS TURBINE ENGINE

FIELD OF THE INVENTION

The invention relates to vibration sensing.

BACKGROUND OF THE INVENTION

Gas turbine engines are commonly equipped with one, or more, accelerometers to detect vibration. Because the accelerometers sometimes malfunction, back-up accelerometers are often provided. The accelerometers add weight to the engine. They also increase costs of manufacturing, design, and maintenance. Further, some accelerometers are fragile, and easily damaged.

SUMMARY OF THE INVENTION

The invention mitigates some, or all, of the disadvantages just identified. One form of the invention detects vibration by analyzing an existing pulse train which is produced by an existing sensor, and presently used for speed measurement. Under the invention, the existing pulse train is used to indicate both speed and vibration.

BRIEF DESCRIPTION OF THE DRAWINGS

FIGS. 2, 3, and 4 illustrate three different positions of tooth 16, and the corresponding reluctance seen by sensor 8.

FIG. 5 is a plot of reluctance seen by sensor 8 in FIG. 4, plotted against angular position.

FIG. 16 is a flow chart illustrating procedures implemented by one form of the invention.

FIG. 17 illustrates one form of the invention.

DETAILED DESCRIPTION OF THE INVENTION

The invention utilizes a pulse train produced by a sensor. Numerous types of sensor can be used. For simplicity, this discussion will be framed in terms of a generic reluctance sensor.

Figure 1:
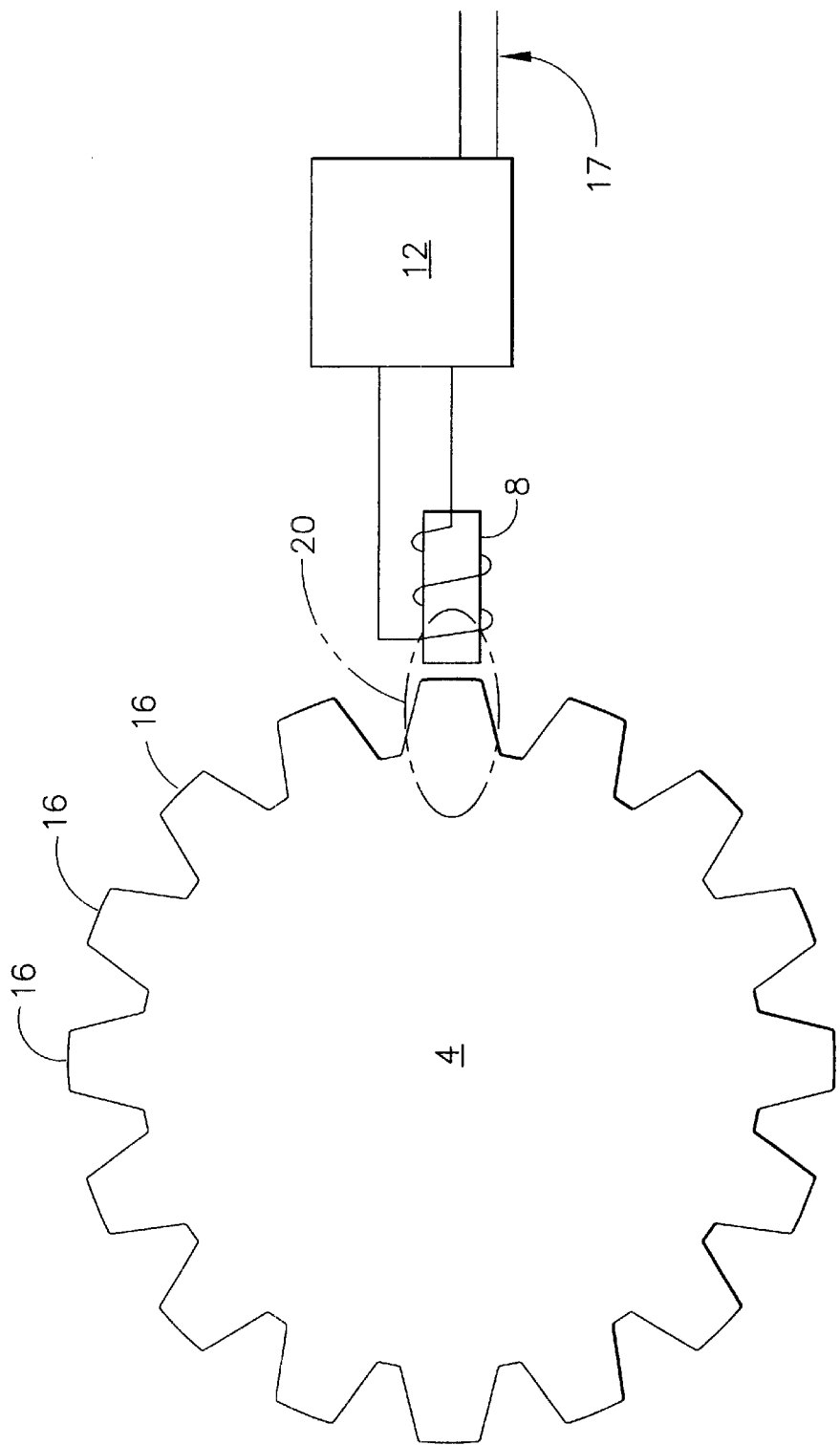
FIG. 1 illustrates a gear 4 and a prior-art reluctance sensor.

FIG. 1 illustrates a prior-art system, including a toothed gear 4, a reluctance sensor 8, and an electronic circuit 12. The electronic circuit 12 detects passage of each tooth 16 past the reluctance sensor 8. The electronic circuit 12 produces a pulse (not shown) in response to each tooth 16, on output 17.

"Reluctance" refers to magnetic reluctance. In general, magnetic reluctance depends on (1) the amount, and (2) magnetic permeability, of material located within dashed region 20. For example, tooth 16 in FIG. 2 is positioned above a reference line 24. The reluctance seen by sensor 8 is indicated by point 28 in the plot 38.

As a second example, tooth 16 in FIG. 3 is positioned at the reference 24. The reluctance is indicated by point 32. As a third example, tooth 16 in FIG. 4 is positioned below the reference 24. The reluctance is indicated by point 36.

A generalized plot 39 of reluctance versus position is given in FIG. 5. It is symmetrical about the reference 24, and has a minimum point 40, corresponding to point 32 in FIG. 3.

Figure 6:
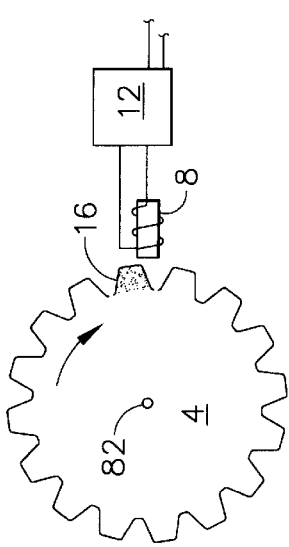

The electronic circuit 12 does not necessarily measure reluctance itself, but often measures a parameter related to the reluctance. For example, FIG. 6 shows a hatched tooth 16. The hatched tooth 16 passes the sensor 8, and moves to the position shown in FIG. 7. In response to this movement, the electronic circuit 12 produces a signal 41 resembling that in FIG. 8. Because of the measurement technique utilized, signal 41 indicates more the slope of the reluctance plot 39 in FIG. 5, rather than the reluctance itself.

Figure 8:
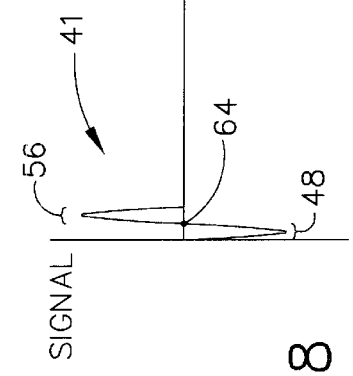
FIG. 8 illustrates a single pulse, produced by electronic circuit 12 in FIGS. 6 and 7, when tooth 16 passes the sensor 8.

For simplicity, the plot of FIG. 8 does not exactly indicate the slopes of every point of the plot 39 in FIG. 5, but only general features. In FIG. 8, region 48, which is negative, corresponds to region 52 in FIG. 5, which has a negative slope. Region 56 in FIG. 8, which is positive, corresponds to region 60 in FIG. 5, which has a positive slope. Point 64 in FIG. 8, which has a value of zero, corresponds to point 40 in FIG. 5, which has zero slope.

Figure 7:
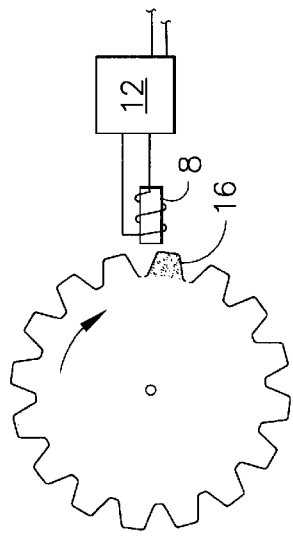
FIGS. 6 and 7 illustrate passage of a single tooth 16 past sensor 8.
Figure 9:
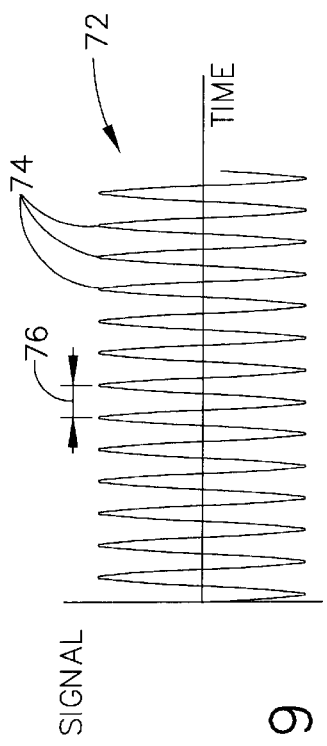
FIG. 9 illustrates a pulse train 72, produced by electronic circuit 12 in FIG. 6, when teeth repeatedly pass the sensor 8.

As successive teeth 16 pass the reluctance sensor 8 in FIG. 7, a train 72 of pulses 74 is generated, as in FIG. 9. If a reluctance sensor is used which measures actual reluctance, as opposed to the slope, then the train of pulses (not shown) will contain a sequence of the plots 39 of FIG. 5.

In the ideal case, the pulses 74 within the train 72 in FIG. 9 will be identical in shape, and the time intervals 76 between adjacent pulses will be identical. The ideal case requires the toothed gear 4 in FIG. 7 to be perfectly symmetrical, perfectly homogeneous in magnetic permeability, and rotating at a constant speed about a fixed center 82 in FIG. 6.

Figure 10:
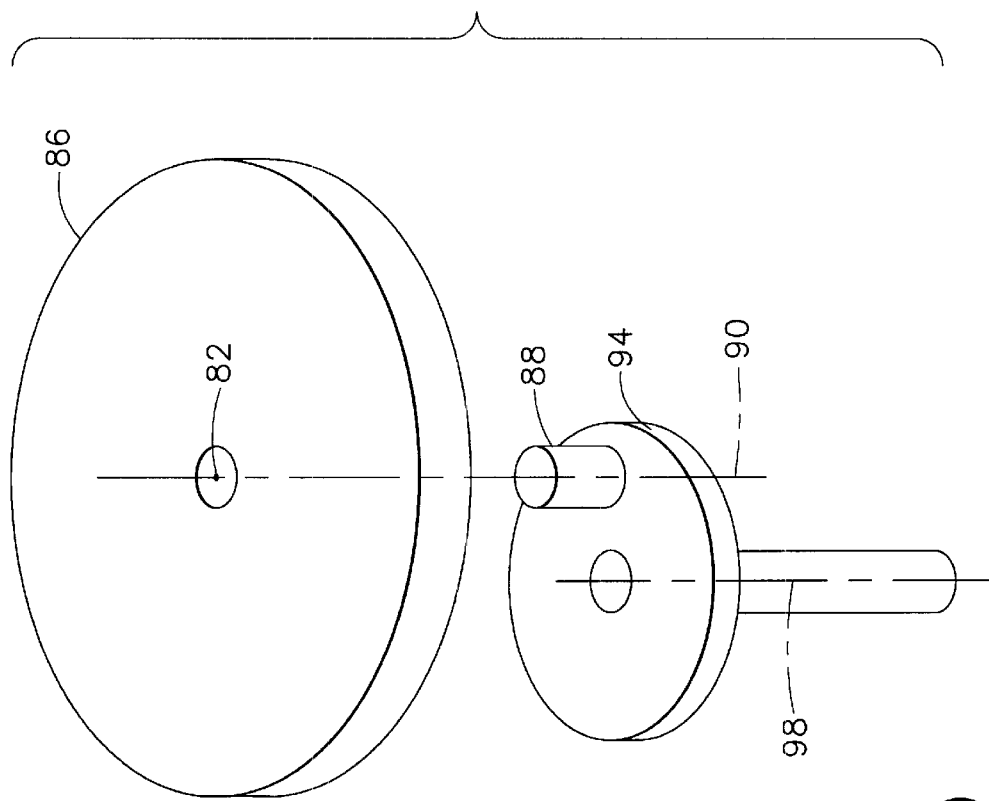
FIG. 10 illustrates how vibration of disc 86, which represents gear 4 in FIG. 1, can be represented as orbiting of shaft 88 about axis 98.

However, if vibration occurs, the ideal case will no longer exist. The toothed gear 4 will not only rotate about its center 82, but center 82 will orbit about another center. FIG. 10 illustrates the situation. Disc 86 represents the toothed gear 4 in FIG. 6. Disc 86 in FIG. 10 is supported by shaft 88, and rotates about axis 90. Center 82 is shown.

Figure 11:
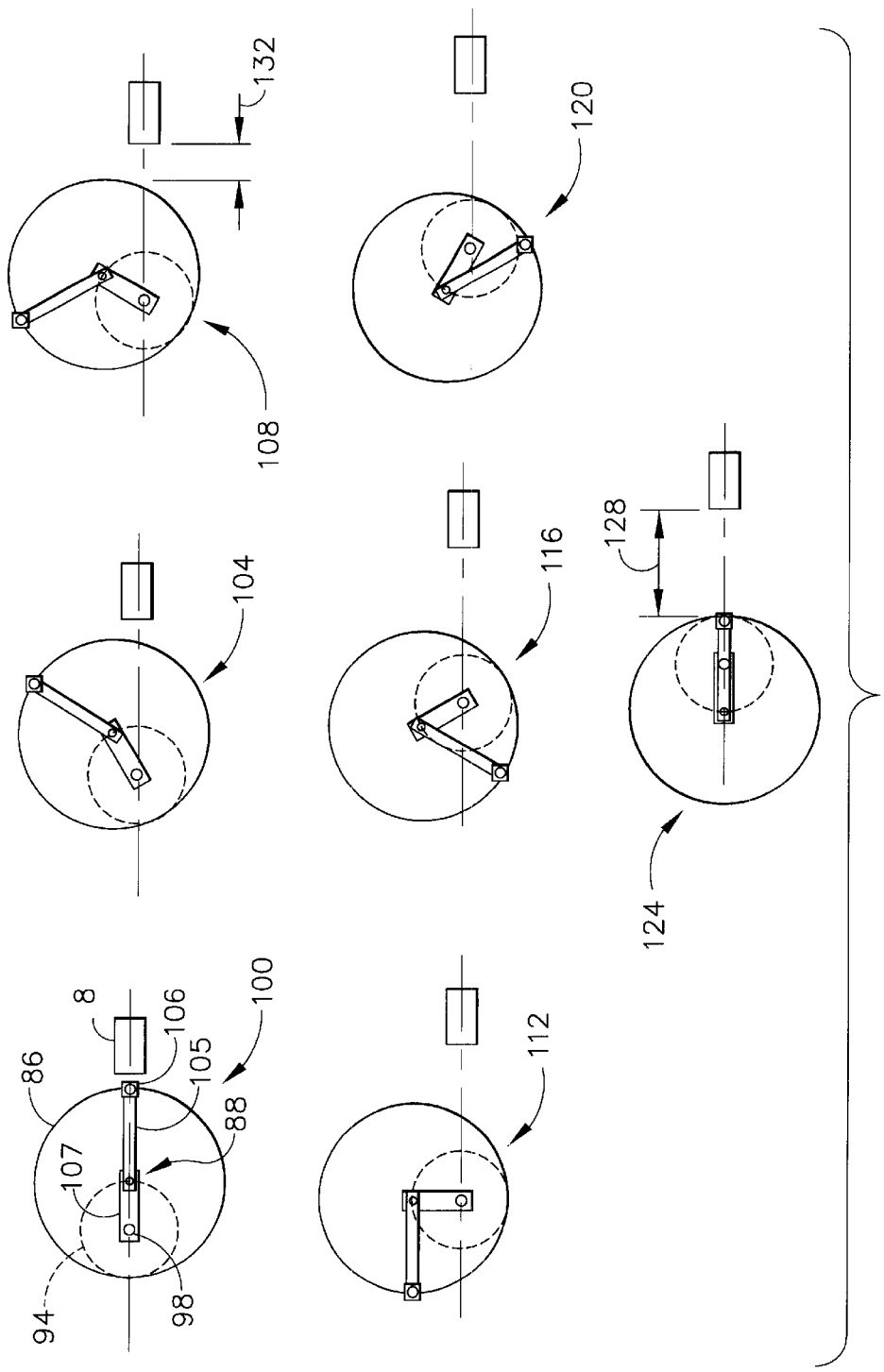
FIG. 11 shows several different rotational positions of the apparatus of FIG. 10.

In addition, to illustrate the orbiting, shaft 88 is supported by a second disc 94. Second disc 94 rotates about second axis 98. FIG. 11 illustrates a sequence of positions which the components of FIG. 10 will occupy during their combined rotation and orbiting.

In FIG. 11, plot 100 indicates the relative arrangement of the components at an initial, reference time. Reluctance sensor 8 is shown, as is shaft 88. An arm 107 is superimposed, to illustrate the fact that disc 94 acts as a crank arm in supporting shaft 88. Arm 107 rotates about center 98. A second arm 105 is shown, to illustrate the fact that disc 86 acts as a crank arm in supporting reference square 106, which represents a tooth 16 of FIG. 1. In FIG. 11, arm 105 rotates about shaft 88.

It is assumed, for simplicity, that both discs 86 and 94, and thus both crank arms 105 and 107, rotate at the same angular speed.

FIG. 11 shows seven plots. Table 1, below, indicates the amount of rotation occurring in each plot. A single amount of rotation is indicated in Table 1 for each plot, because, as stated above, both crank arms 105 and 107 rotate at the same angular speed, although about different centers.

Since they rotate at the same speed, at any given time, their angular displacements from the initial position of plot 100 will be identical. That is, at any given time, both cranks 105 and 107 will experience the same total rotation, but about different centers.

TABLE 1

| ROTATION | PLOT IN FIG. 11 | TOTAL AMOUNT OF (Degrees) |
|---|---|---|
|  | 100 | zero |
|  | 104 | 30 |
|  | 108 | 60 |
|  | 112 | 90 |
|  | 116 | 120 |
|  | 120 | 150 |
|  | 124 | 180 |

Two significant features of the combined rotations of FIG. 11 are significant. One is that the distance between disc 86 and the reluctance sensor 8 changes, as the rotations occur. As a specific example, distance 128 in plot 124 is greater than distance 132 in plot 108. The change in the distance will change the reluctance signal produced by sensor 8.

Figure 12:
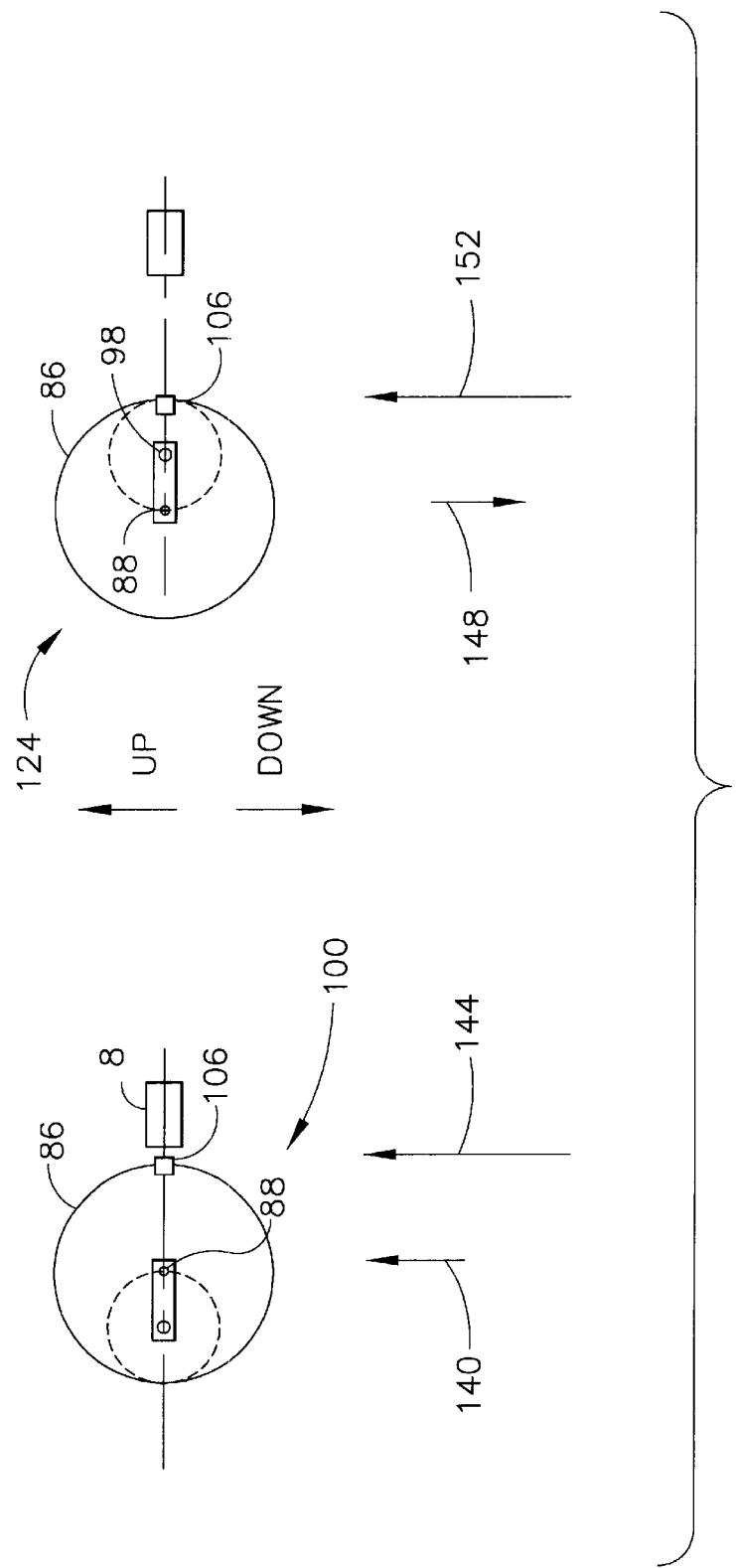
FIG. 12 illustrates plots 100 and 124 of FIG. 11, and is used to show a velocity change.

A second feature is that the velocity with which disc 86 passes the reluctance sensor 8 changes as the combined rotation and orbiting occurs. FIG. 12 illustrates this change, and contains copies of plots 100 and 124 from FIG. 11. All rotation is counter-clockwise. To simplify the explanation, only the component of velocity in the vertical direction in FIG. 12 will be considered. "Up" and "down" are labeled in the center-of the Figure.

In plot 100, vector 140 represents the velocity of shaft 88 in the vertical direction. Since shaft 88 is the axle about which disc 86 rotates, vector 140 also represents the translational velocity of the entire disc 86, in the upward direction. Since reference box 106 is attached to disc 86, vector 140 also represents one velocity component of box 106 in the upward direction.

In addition, vector 144 represents the additional velocity of box 106, due to the rotation of disc 86 about shaft 88. The net velocity of box 106 in the upward direction is the vector sum of vectors 140 and 144. The net velocity is relatively high, compared with that of plot 124, which will now be considered.

In plot 124, shaft 88 is now moving downward, because shaft 88 rotates counterclockwise about shaft 98. Vector 148 indicates its downward component of velocity. Since disc 86 is attached to shaft 88, vector 148 also indicates the downward translational velocity of the entire disc 86. Thus, box 106 has a component of velocity in the downward direction, indicated by arrow 148, due to the downward translation of disc 86.

In addition, box 106 has a component of velocity in the upward direction, because of the rotation of disc 86 about shaft 88. Vector 152 indicates that component. The net velocity of box 106 in the vertical direction is the vector sum of vectors 148 and 152. The net velocity is relatively low, compared with that of plot 100, because vectors 148 and 152 for plot 124 oppose each other.

Therefore, vibration of disc 86 in FIG. 10 can take the form of orbiting of shaft, or center, 88 about axis 98. Disc 86 represents the toothed gear 4 of FIG. 6. The orbiting causes two events to occur in the parameter measured by the sensor 8 and electronic circuit 12 in FIG. 6.

One event is that the orbiting causes a change in the reluctance signal, because the orbiting causes the reluctance seen by sensor 8 to change. The second event is that the orbiting changes the tangential speed at which the circumference of disc 86 in FIG. 11 passes the sensor 8. Since the teeth 16 in FIG. 6 are located at that circumference, their speed will change as orbiting occurs.

Figure 13:
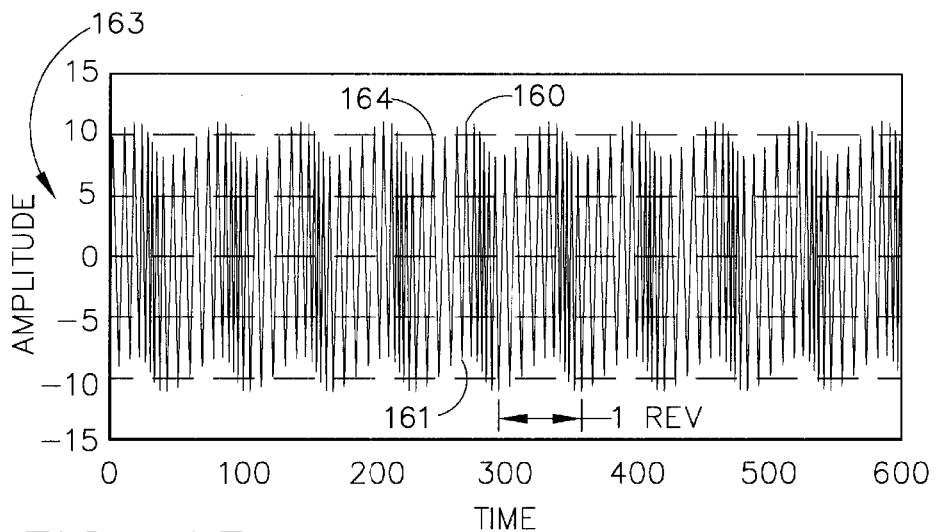
FIG. 13 illustrates amplitude modulation of the pulse train 72 of FIG. 9.
Figure 15:
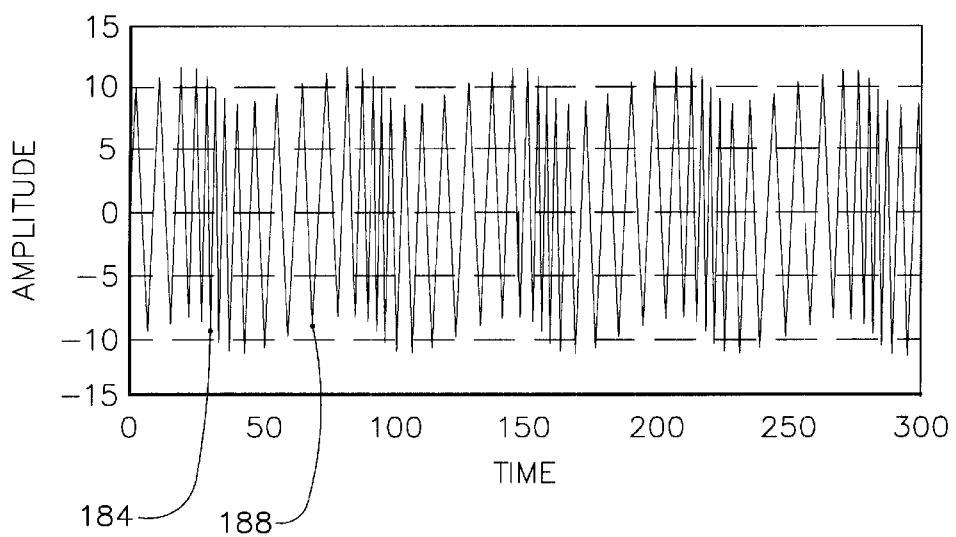
FIG. 15 illustrates frequency modulation of the pulse train 72 of FIG. 9.

FIGS. 13 and 15 illustrate how these two events affect the pulse train 72 in FIG. 9. FIG. 13 shows a type of amplitude modulation: the amplitude at point 160 is larger than that at point 164. The amplitude change is caused by the movement of disc 86 in FIG. 11 toward, and away from, sensor 8. The orbiting about center 98 causes the movement. Amplitude is measured from zero to a point such as 160.

Most of the pulses shown in FIG. 13 are not symmetrical about the zero amplitude axis 163. The reasons for this are complex, and depend partly on the technique used to produce the pulse train shown in the Figure. However, one factor affecting the lack of symmetry is shown in FIG. 14.

Figure 14:
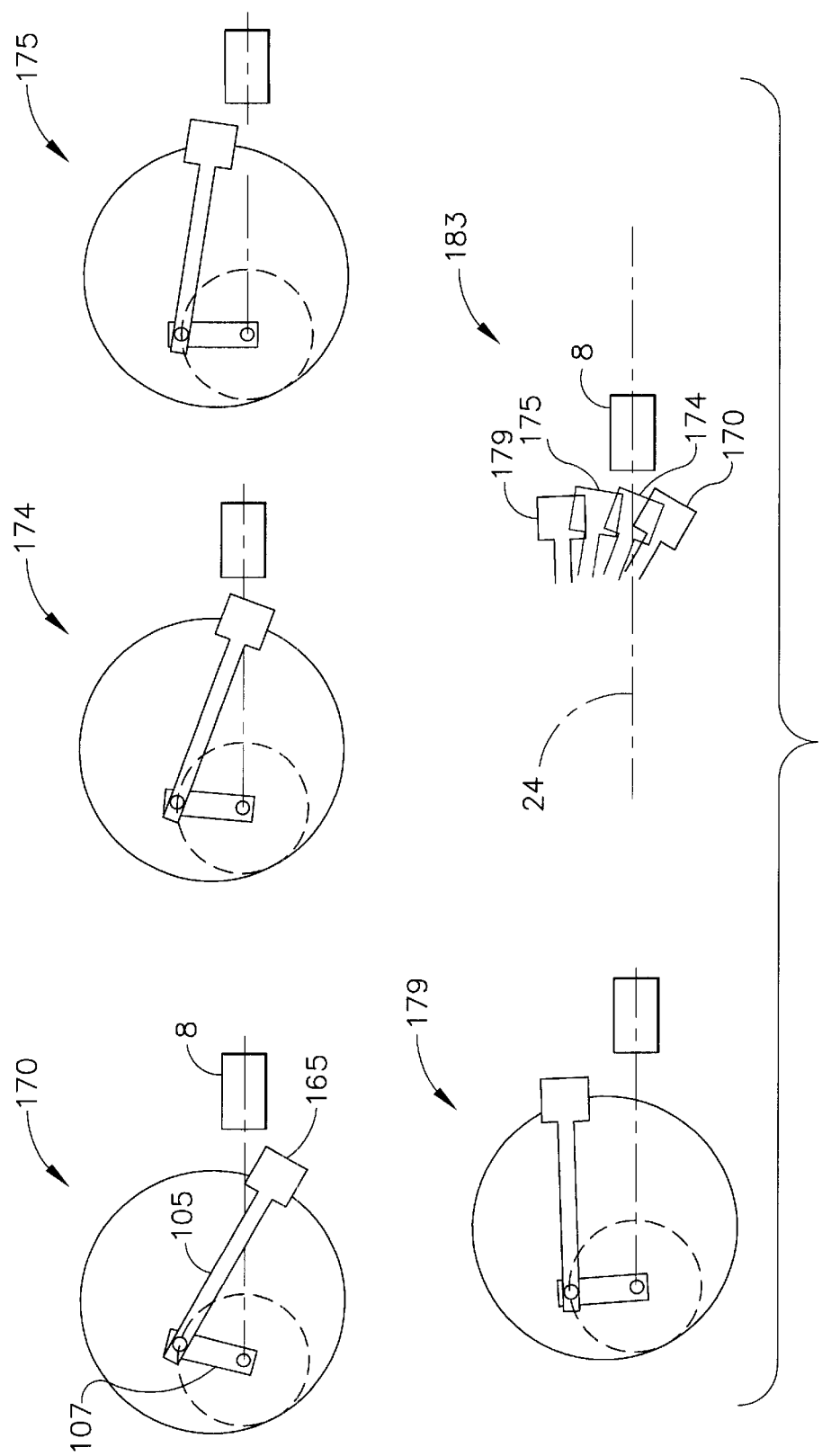
FIG. 14 illustrates how reference block 165, indicating a tooth 16 in FIG. 1, follows a non-symmetrical path when orbiting of disc 86 occurs, thereby causing the amplitude modulation of FIG. 13.

In FIG. 14, plots 170, 174, 175, and 179 show four successive positions of reference block 165. These four positions are superimposed together in plot 183, and labeled with their corresponding plot numbers.

Plot 183 indicates that the path of the block 165 is not symmetrical about axis 24. This lack of symmetry is partly responsible for the lack of symmetry in FIG. 13, about the zero-amplitude axis 163. For example, in a very general sense, point 160 in FIG. 13 may correspond to the position of block 165 in plot 170 in FIG. 14, where reluctance is somewhat high. Point 161 in FIG. 13 may correspond to the position of block 165 in plot 179 in FIG. 14, where reluctance is somewhat low. Plot 183 in FIG. 14 illustrates the two positions in a single plot, more clearly showing the difference in reluctance.

FIG. 15 shows a type of frequency modulation: the frequency is higher at time 184 than at time 188. The higher frequency, that is, a smaller time interval between adjacent pulses, would occur in, for example, plot 100 in FIG. 11. In plot 100, tangential speed is relatively larger, as explained in connection with FIG. 12.

A smaller frequency, that is, a larger time interval between adjacent pulses, would occur in plot 124 of FIG. 11. In plot 124, tangential speed is relatively smaller.

Therefore, two changes occur as the disc 86 in FIG. 10 rotates and orbits. One involves the changes in distance between disc 86 in FIG. 11 and the sensor 8. These changes cause changes in reluctance. The changes in reluctance cause amplitude modulation of the pulse train, as shown in FIG. 13.

The second change involves the changes in tangential speed of the disc 86. The changes in speed cause frequency modulation, as shown in FIG. 15.

FIG. 16 is a flow chart of logic used to detect the amplitude and frequency modulations shown in FIGS. 13 and 15. Block 190 indicates that the pulse train, such as that of FIG. 9, is received. The pulse train may, or may not, contain the amplitude modulation or frequency modulation shown in FIGS. 13 and 15.

Block 192 in FIG. 16 indicates that rotational speed of the toothed gear 4 in FIG. 1 is-computed. For example, assume that the spacing between gear teeth 16 is ten degrees. If 15 pulses are counted in 0.01 seconds, then rotational speed is computed as (15×10) degrees/0.01 second. This quotient corresponds to 15,000 degrees per second, or roughly 41 revolutions per second.

Block 194 indicates that amplitude modulation is detected. Such detection is well known, and numerous different techniques can be used. As a simple example, the amplitude of each pulse 74 in FIG. 9 can be stored in a stack memory. The stack memory may contain 1,000 memory locations. When the stack becomes filled, the earliest amplitudes stored in it become lost.

As a specific example, amplitudes 1 through 1,000 may be stored in the stack, in sequence. At this time, the stack has become filled. When amplitude 1,001 is added, amplitude 1 becomes lost. When amplitude 1,002 is added, amplitude 2 becomes lost, and so on.

A detection routine looks for deviations in the amplitudes stored in the stack. As a simple example, the detection routine may scan the stack, and find both the largest amplitude and the smallest amplitude. If the difference between them exceeds a threshold, then unacceptable vibration is inferred.

Block 196 in FIG. 16 indicates that frequency modulation is detected. Such detection is well known, and numerous different techniques can be used. As a simple example, a second stack may be used, containing the time intervals between each adjacent pair of the 1,000 amplitudes stored in the first stack. A detection routine may scan the second stack, looking for the largest and the smallest interval. If the difference between them exceeds a threshold, then unacceptable vibration is inferred.

Block 198 indicates that a warning is issued if unacceptable vibration is found. For example, a warning signal can be transmitted to the cockpit of an aircraft, if either amplitude modulation or frequency modulation exceeds a limit.

Alternately, numerical values indicating the amount of frequency modulation, and amount of amplitude modulation, can be displayed to an operator, such as a pilot. In communications work, modulation of a carrier is commonly expressed as a percentage, such as fifty-percent modulation. This convention can be used by the invention.

Other, more complex, approaches can be undertaken in detection of the modulations. For example, one goal may be to detect excessive deviation, in frequency and amplitude, of a measured pulse train from an ideal pulse train. To identify the deviation, a Fast Fourier Transform, FFT, of the pulse train is taken.

If the pulse train is an ideal pulse train, containing identical pulses, identically spaced, it will have a given distribution of Fourier terms. Further, if the pulses are true sine waves, a single Fourier term will exist.

Modulation of the pulse train, either in amplitude or frequency, will alter the terms of the Fourier series. If the alteration exceeds a threshold, then unacceptable vibration will be inferred. As a simple example, if the base frequency term, plus the three lowest three harmonics, change by ten percent each, then unacceptable vibration will be inferred. More generally, if any of the first N harmonics change by X percent each, then unacceptable vibration will be inferred.

FIG. 17 illustrates one form of the invention. A turbofan aircraft engine 203 is shown, containing a high pressure compressor 200, a high pressure turbine 204, a fan 208, and a low pressure turbine 212. Toothed gear 4 is shown, and is used to measure speed of fan 208. Toothed gear 4 need not actually function as a gear, but can be used as a toothed wheel solely to produce pulses.

Block 216 represents the reluctance sensor and associated electronics, which produces the pulse train 72 of FIG. 9.

The computation indicated by the flow chart of FIG. 16 is undertaken by apparatus represented by block 220 in FIG. 17. Alternately, the computation of block 220 can be performed by the digital engine control 224.

The engine control 224 is known in the art. It measures various operating parameters, such as component speeds, airflows, and pressures. Based on those parameters, it schedules, or controls, other parameters, such as fuel-air ratio, blade cooling, and stator vane angle. The control 224 contains a microprocessor (not shown) which can perform the computations described in connection with FIG. 16.

The discussion herein has been framed in terms of a reluctance sensor. However, a reluctance sensor is not required. Other sensors can produce the pulse train of FIG. 9, in response to the passage of teeth on a wheel. The sensor used should produce pulses of different sizes, when distance to the teeth changes. The sensor should also produce pulses, in response to passage of teeth 16 in FIG. 1, so that the pulse frequency changes, when the speed of passage of the teeth changes. Some examples of sensors are Hall Effect sensors, optical proximity sensors, and microwave proximity sensors.

Numerous substitutions and modifications can be undertaken without departing from the true spirit and scope of the invention. What is desired to be secured by Letters Patent is the invention as defined in the following claims.

What is claimed is:

1. Method of operating a machine, comprising:
   a) deriving a pulse train from a rotating component; and
   b) using the pulse train to
      i) compute rotational speed of the component; and
      ii) infer vibration in the component.

2. Method according to claim 1, wherein the machine comprises a gas turbine engine.

3. Method according to claim 1, wherein the rotating component comprises teeth which sequentially cross a detection region of a sensor.

4. Method according to claim 3, wherein the sensor produces a train of pulses, vibration of the component causes modulation of the pulses, and the vibration is inferred from the modulation.

5. Method according to claim 3, wherein said vibration of the component is inferred from modulation of a train of pulses which is produced by rotation of said component.

6. Method according to claim 1, and further comprising the steps of deriving Fourier coefficients of the pulse train and using the Fourier coefficients to infer said vibration.

7. Method according to claim 6, wherein vibration is inferred from a change in the Fourier coefficients.

8. Method according to claim 1, wherein amplitude modulation is present in the pulses and vibration is inferred when the amplitude modulation exceeds a limit.

9. Method according to claim 1, wherein frequency modulation is present in the pulses, and vibration is inferred when the frequency modulation exceeds a limit.

10. Method of operating a machine, comprising:
   a) producing a derived pulse train from a rotating component, wherein vibration in the component causes deviation in the derived pulse train from an ideal pulse train;

b) using the derived pulse train to compute rotational speed of the component; and
c) using the deviation to conclude the presence of vibration in the component.

11. Method, comprising the following steps:
a) rotating a component in a gas turbine engine, said component containing a disc having teeth distributed along its circumference;
b) maintaining a sensor near said disc, which produces i) one type of pulse when a tooth passes, when the disc is positioned at a first position; and
   ii) a second type of pulse when a tooth passes, when the disc is positioned at a second position;
c) computing rotational speed of the component, based on frequency of the pulses;
d) inferring vibration of the component, based on modulation of the pulses.

12. Method according to claim 11, wherein vibration of the component causes amplitude modulation of the pulses, and vibration is inferred when the amplitude modulation exceeds a limit.

13. Method according to claim 11, wherein vibration of the component causes frequency modulation of the pulses, and vibration is inferred when the frequency modulation exceeds a limit.

14. Method according to claim 11, wherein the sensor senses changes in magnetic reluctance caused by passage of the teeth.

* * * * *